United States Patent [19]

Bailey et al.

[11] Patent Number: 5,844,329

[45] Date of Patent: Dec. 1, 1998

[54] SYSTEM AND METHOD FOR PROVIDING UNINTERRUPTED POWER TO ON BOARD ELECTRICAL EQUIPMENT

[75] Inventors: Dale R. Bailey, Milford; Anthony F. Sodoski, Derby; Robert E. Lundberg, Shelton, all of Conn.

[73] Assignee: Sikorsky Aircraft Corp., Stratford, Conn.

[21] Appl. No.: 883,017

[22] Filed: Jun. 26, 1997

Related U.S. Application Data

[63] Continuation of Ser. No. 567,519, Dec. 5, 1995, abandoned.

[51] Int. Cl.$^6$ ................................................. H02J 7/00
[52] U.S. Cl. .............................. 307/66; 307/64; 307/67
[58] Field of Search ........................... 307/64, 66, 67; 245/176, 175, 177–180; 248/554, 555, 556, 567

[56] References Cited

U.S. PATENT DOCUMENTS 4,604,528  8/1986  Norton ................................ 307/10
5,194,757  3/1993  Wertheim ........................... 307/87

Primary Examiner—William M. Shoop, Jr.
Assistant Examiner—Kim Lockett
Attorney, Agent, or Firm—William W. Jones

[57] ABSTRACT

A craft, such as an aircraft, landcraft, watercraft, space craft, or the like, is provided with a power transfer system which ensures an uninterrupted supply of electrical power to on board electrical equipment during normal switching from one power supply to another i.e., switching which is not due to system failure, which switching may be initiated either manually by the pilot, or automatically by the system. The power transfer system can be used with separate DC power sources, and includes a split bus assembly which ensures a continuous electrical equipment supply from a first operating power source until after a second different power source has been energized and begun to supply operating power to the electrical equipment in question. Once the second power supply is brought on line, the first power supply can be shut down. The system can be used when switching between different on board power supplies or when switching between on board and external power supplies.

4 Claims, 1 Drawing Sheet

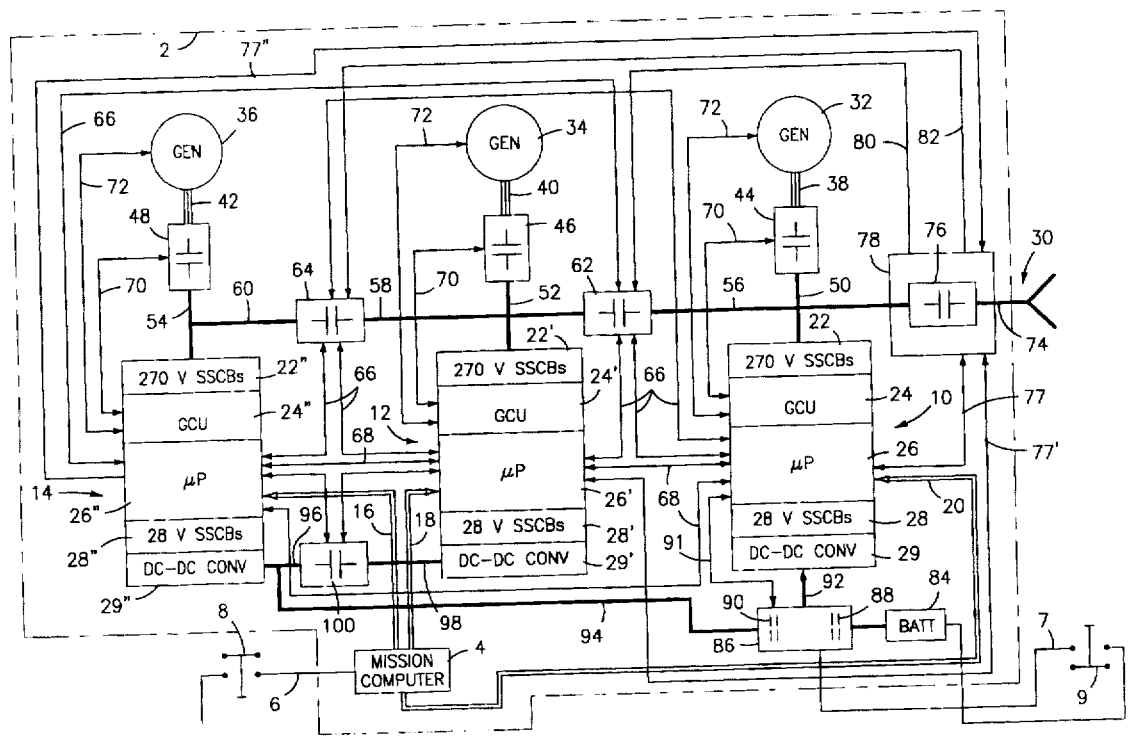

SYSTEM AND METHOD FOR PROVIDING UNINTERRUPTED POWER TO ON BOARD ELECTRICAL EQUIPMENT

This is a continuation of U.S. Ser. No. 08/567,519, filed Dec. 5, 1995 now abandoned.

The Government has rights in this invention pursuent to Contract No. DDDJ09-91-C-A004 awarded to by the Department of the Army.

TECHNICAL FIELD

This invention relates to a system and method for providing an uninterrupted supply of electrical power to electrically-powered equipment during switching from one electrical power source to another. More particularly, the system and method of this invention involves the use of a split bus which selectively interconnects several different electrical power sources to one or more pieces of electrically-powered equipment.

BACKGROUND ART

Modern high-tech craft, such as aircraft, water craft, land craft and space craft may be provided with on board sophisticated equipment which may include or may be linked to on board microprocessors. Such microprocessors will include preprogrammed computers that are operable to control operational components of the craft; and computers which are operable to gather and store operating data during operation of the craft. One example of such a craft is a modern helicopter which is equipped with an array of on board microprocessors that are essential to proper operation of the helicopter. Other examples of such craft are tanks, ships, space shuttles, and the like.

Using a current helicopter design as a typical example of a craft which employs one or more on board microprocessors which are essential to its operation, the power supply for the on board microprocessors will be derived both from on board electrical power sources and from external electrical power sources. The external power sources will typically be used during startup and shut down of the helicopter; and the on board power sources will be used during ground and in flight operation of the helicopter. While particular emphasis is placed herein on on board microprocessors, it will be understood that the helicopter (or other craft) also includes other types of electrically operated components which derive their power from the on board alternating current (AC) electrical power sources. The external power is derived from mobile AC power carts which can be selectively connected to the helicopter's main power bus.

As previously noted, a changeover is made between the external power source to the on board power during startup and shut down of the helicopter. During startup, the external power source is connected to the helicopter's main bus and is used to supply power to all of the helicopter's electrically operated equipment, as directed by the pilot. Proper operation of all of the helicopter's electrical equipment can thus be verified by the crew while the helicopter is connected to the external power supply. After the preflight check is completed, the on board power sources, typically generators, are turned on, and then sequentially connected into the helicopter's main bus. The generators with nominal AC voltage will not be switched onto the main bus simultaneously due to the fact that such a procedure would damage the electrical system of the helicopter unless the generators were all perfectly synchronized at the moment the connections are made. As the generators are switched onto the main electrical power bus, the external power source to the corresponding circuits on the helicopter is turned off. When the changeover is made from external to on board power sources, it is important that there be no interruption in the power supply to the on board electrically operated equipment. One reason that power interruptions are undesirable is that the microprocessors, when denied power, will stop communicating with the other equipment and go through a startup sequence not only of themselves, but as a central control unit also commanding other pieces of electronic equipment to do so. This causes a restart of the system initialization process and temporary blank out of displays vital to the operation of the aircraft. It is also important, for the same reasons, that there be no interruption in power supply to electrical equipment, when switching between the several generators or batteries which are on board the helicopter to supply on board operating power.

The desirability of providing an uninterrupted power supply when switching from one power source to another has been recognized by those skilled in the art, and has been resolved in the past by the use of large capacitors and/or diode circuitry which can provide the short-term power needed during the time period between disconnecting one power supply and connecting another power supply. The electrical load of a particular piece of equipment shall dictate the size of the hold capacitors required to perform this no-break in power function. As a result, they can be undesirably large, take up valuable space, and also increase system cost and weight. Additional system weight adversely affects the range and maneuverability of any aircraft.

It would be highly desirable to provide a lightweight, compact, low cost system that would ensure a continuous and uninterrupted power supply to on board electronic equipment in a craft such as a helicopter or the like, during periods of changeover from one power source to another.

DISCLOSURE OF THE INVENTION

This invention is directed to a system and method for ensuring that the DC electrical power supply to on board electronic equipment will not be interrupted during changeover from one power supply to another, and which does not require speed synchronization between the several on board generators. The system and method of this invention utilize a split bus in the craft as the primary electrical power transfer conductor. By "split" is meant that the power distributing bus is subdivided into segments which can be selectively interconnected, or disconnected, as required in order to ensure that the power supply to the on board electronic equipment will not be interrupted during any normal power supply changeovers. The system of this invention is operable during changeovers from one on board power source to another on board power source, and is also operable during changeovers between on board and external power sources. The system of this invention utilizes lightweight software and compact components which impose essentially no additional weight or space constraints to the helicopter, or any other craft in which the system is used. The system of this invention can operate with one or more on board generators or batteries, which can be either high and/or low DC voltage power sources.

It is therefore an object of this invention to provide a system and method for ensuring an uninterrupted supply of power to electronic components during periods of changeover from one power source to another when these power sources are manually turned "on/off", or are automatically disconnected through generator drive train speeds.

It is a further object of this invention to provide a system and method of the character described which is useful in a mobile craft having an on board power supply.

It is another object of this invention to provide a system and method of the character described which utilizes an on board split bus design for distributing electrical power to on board electronic components on the craft.

It is an additional object of this invention to provide a system and method of the character described wherein the split bus design can selectively interconnect one or more on board power sources with a plurality of on board electronic equipment.

It is yet another object of this invention to provide a system and method of the character described wherein the split bus can selectively interconnect on board electronic equipment to more than one on board power sources and to an external power source during startup and shut down of the craft.

BRIEF DESCRIPTION OF THE DRAWING

These and other objects and advantages of the invention will become more readily apparent from the following detailed description of a preferred embodiment of the invention when taken in conjunction with the accompanying drawing which is a schematic representation of a helicopter electrical power system which is on board the craft, and which can be connected to a power source which is external of the helicopter during periods of startup and shut down of the helicopter.

BEST MODE FOR CARRYING OUT THE INVENTION

The on board electrical system is denoted generally by the numeral 2. The system 2 includes a mission computer 4 which is preprogrammed to control various aspects of the helicopter's in-flight operation, and which is also operable to respond to various pilot commands to alter in-flight operation of the system 2. The pilot may transmit commands to the mission computer 4 through lines 6 by manually actuating cockpit switches 8. The mission computer 4 is operably connected to several different power system controller assemblies 10, 12 and 14 via data buses 16, 18 and 20 respectively. Each power system controller assembly 10, 12 and 14 includes 270 V DC solid state circuit breakers (SSCB's) 22, 22', 22"; generator control unit components 24, 24', 24"; controller microprocessor components 26, 26', 26"; and 28 V DC solid state electronic circuit breaker components (SSCB's) 28, 28', 28". The mission computer 4 is operable to selectively modify operation of each of the power system control microprocessors 26, 26', 26" through the lines 16, 18 and 20 as will be described in greater detail hereinafter.

The system 2 includes an external power connector component 30 which, when connected to an external DC power source, can be used to supply power to all, or selected parts of the system 2, as will be explained hereinafter. The system includes a plurality of generators 32, 34 and 36. The generators 32, 34 and 36 provide DC electrical power to the power system controller assemblies 10, 12 and 14 respectively through generator feeder lines 38, 40 and 42; contactor switches 44, 46 and 48; and main system bus lines 50, 52 and 54. It will be understood from the above that each of the on board power generators 32, 34 and 36 is normally dedicated to a respective one of the power system controller assemblies 10, 12 and 14 when each of the generators 32, 34 and 36 is in service. Thus, during normal operation of the helicopter the contactor switches 44, 46 and 48 will all be closed, and each power system controller assembly 10, 12 and 14 will be powered by its own dedicated generator 32, 34 and 36 providing the electrical on board split bus design. In a preferred embodiment of the invention, the generators 32, 34 and 36 provide 270 V DC power to the power system controller assemblies 10, 12 and 14.

While each generator 32, 34 and 36 normally supplies power to one of the power system controller assemblies 10, 12 and 14 respectively, the system 2 also allows any one of the generators 32, 34 or 36 to supply power to more than one of the power system controller assemblies 10, 12 and 14 as follows. The generator buses 50, 52 and 54 are tied into transverse buses 56, 58 and 60 respectively. The transverse buses 56, 58 and 60 can be selectively interconnected by bus tie contactors 62, 64 and an external power connector 76, which is described in greater detail hereinafter. The state of the bus tie contactors 62 and 64 is controlled and monitored by the power system control assembly microprocessors 26, 26', 26" via lines 66. It is also noted that the microprocessors 26, 26', 26" communicate with each other via lines 68. Each of the generator control units 24, 24', 24" controls and monitors the state of its respective generator line contactor 44, 46 and 48 via lines 70; and also controls and monitors the state of its respective generator 32, 34 and 36 via lines 72. Assume that the pilot desires to disconnect the generator 34 in order to perform an on-ground maintenance or system trouble shooting check. He signals the mission control computer 4 via line 6 that the generator 34 is to be disconnected, and the mission control computer 4 instructs the respective power system control computer 26' that its generator control unit 24' is to disconnect the generator 34. Power system control computer 26' then instructs via line 68 that the generator 34 is to be disconnected and that generator 36 is to supply further power to the power system control assembly 12. At this time all three system control computers 26, 26' and 26" closes the bus tie contactor 64 an instant before the generator line contactor 46 is opened. The actual time lapse between closing a bus tie contactor and opening a generator line contactor can be preprogrammed into the system. A typical delay would be on the order of hundreds of milliseconds. Thus, for an instant, power will be supplied to a power system control assembly from two different electrical power sources, and there will be no interruption in power to the electronic equipment when one of the sources is disconnected. It will be noted from the above description that when any one of the generators is to be shut down, any one of the other generators can be used to continue to supply power to the power system control assembly in question.

The following describes the manner in which uninterrupted power is supplied to the system components during startup and shut down of the helicopter. As previously noted, the electronic components of the helicopter can be powered by an external DC power source(not shown) which can be temporarily connected to an external power connector 30. The external power connector 30 leads to a bus 74 which in turn is connected to an external power bus tie contactor 76 contained in an external power monitor 78. The external power monitor 78 is an electrical power quality monitor that controls the state of the bus tie contactors 62 and 64 through lines 80 and 82 respectively. During startup, when the external power source is plugged into the external power connector 30, the power monitor 78 will be activated and the bus tie contactors 76, 62 and 64 will all be closed. The generator line contactors 44, 46 and 48 will be open as the result of a previous shut down, as will be described hereinafter, and the on board generators 32, 34 and 36 will all have been shut down.

Startup of the no break power transfer sequence with external power connected (270 V DC) can be accomplished as follows.

1. External power is connected to the aircraft's external power connector 30. The external power monitor 78 determines whether:

a) a main aircraft power source is supplying electrical power to the aircraft; and
   b) also the quality of the electrical power being connected to the aircraft. If the external power monitor 78 does not receive an indication that the aircraft is being powered by any of the aircraft's power sources, the external power monitor 78 will then allow power to be supplied to the aircraft by closing the external power connector 76 and closing bus-tie contactors 62 and 64.

2. Once the generator 32 is started, it comes on line by closure of the generator line contactor 44. At this time the generator 32 is paralleled with external power for a short period of time, for example for about 200 milliseconds. After the time delay the power system controller 10 provides a generator 32 "on" signal to the external power monitor 78 via line 77, and then the external power monitor 78 disconnects external power from the aircraft by opening the contactor 76. It is noted that each of the power system controllers 10, 12, and 14 is operatively connected to the external power monitor 78 via lines 77, 77' and 77" respectively so that any one of the power system controllers can selectively control the state of the monitor 78.

External power is always disconnected from the aircraft after any main aircraft power source is operating. The external power contactor 76 deenergizes after a momentary delay, causing the main aircraft power source and the external power source to be momentarily paralleled. No-break-power transfer operation is again utilized when transferring from the generator 32 to the generators 34 and 36 as they are brought on line. Shut down is accomplished in a similar manner as startup by reversing the process. It will be appreciated that the bus segments 56, 58, 60 and 74 form adjacent components of the split primary electrical power transfer bus which provides power for the electronic equipment assemblies on board the aircraft.

Tables I and IA show the no break power transfer of each of two normal aircraft startup sequences. The startup sequence shown in Table I shows the no break power transfer function of paralleling power sources assuming generator 34 comes on before generator 36. The alternative startup sequence shown in Table IA shows the no break power transfer function of paralleling power sources assuming generator 36 comes on before generator 34.

Tables II and IIA show the no break power transfer of each of two normal aircraft shut down sequences. The shut down sequence shown in Table II shows the no break power transfer function of paralleling power sources assuming generator 34 turns off before generator 36. The alternative shut down sequence shown in Table IIA shows the no break power transfer function of paralleling power sources assuming generator 36 turns off before generator 34.

TABLE I

Startup Sequence
Startup sequence — No-break power transfer (NBPT)

| Sequence No. | Power Sources Available | No. 1 270 VDC Bus(58) Powered From | No. 2 270 VDC Bus(60) Powered From | No. 3 270 VDC Bus(56) Powered From | No-Break Power Status |
|---|---|---|---|---|---|
| 1 | External PWR | External PWR | External PWR | External PWR | — |
| 2 | Gen (32) (on) /External PWR | Gen (32) + /External PWR | Gen (32) + /External PWR | Gen (32) + /External PWR | NBPT completed |
| 3 | Gen (32) /External PWR | Gen (32) | Gen (32) | Gen (32) | — |
| 4 | Gen (32)/ Gen (34) (on) /External PWR | Gen (32) + Gen (34) | Gen (32) + Gen (34) | Gen (32) + Gen (34) | NBPT completed |
| 5 | Gen (32)/ Gen (34) /External PWR | Gen (34) | Gen (34) | Gen (32) | — |
| 6 | Gen (32)/Gen (34) /Gen (36) (on) /External PWR | Gen (34) + Gen (36) | Gen (34) + Gen (36) | Gen (32) | NBPT completed |
| 7 | Gen (32)/Gen (34) /Gen (36) /External PWR | Gen (34) | Gen (36) | Gen (32) | — |

TABLE IA

Startup Sequence
Startup sequence — No-break power transfer (NBPT)

| Sequence No. | Power Sources Available | No. 1 270 VDC Bus(58) Powered From | No. 2 270 VDC Bus(60) Powered From | No. 3 270 VDC Bus(56) Powered From | No-Break Power Status |
|---|---|---|---|---|---|
| 1 | External PWR | External PWR | External PWR | External PWR | — |
| 2 | Gen (32) (on) /External PWR | Gen (32) + /External PWR | Gen (32) + /External PWR | Gen (32) + /External PWR | NBPT completed |
| 3 | Gen (32) /External PWR | Gen (32) | Gen (32) | Gen (32) | — |
| 4 | Gen (32)/ Gen (36) (on) /External PWR | Gen (32) + Gen (36) | Gen (32) + Gen (36) | Gen (32) + Gen (36) | NBPT completed |
| 5 | Gen (32)/ Gen (36) /External PWR | Gen (36) | Gen (36) | Gen (32) | — |
| 6 | Gen (32)/Gen (36) /Gen (34) (on) /External PWR | Gen (34) + Gen (36) | Gen (34) + Gen (36) | Gen (32) | NBPT completed |
| 7 | Gen (32)/Gen (36) /Gen (34) /External PWR | Gen (34) | Gen (36) | Gen (32) | — |

25

TABLE II

Shutdown Sequence
Shutdown sequence — No-break power transfer (NBPT)

| Sequence No. | Power Sources Available | No. 1 270 VDC Bus(58) Powered From | No. 2 270 VDC Bus(60) Powered From | No. 3 270 VDC Bus(56) Powered From | No-Break Power Status |
|---|---|---|---|---|---|
| 1 | Gen (32)/Gen (34) /Gen (36) /External PWR | Gen (34) | Gen (36) | Gen (32) | — |
| 2 | Gen (32)/ /Gen (34) (off) /Gen (36) /External PWR | Gen (34) + Gen (36) | Gen (34) + Gen (36) | Gen (32) | NBPT completed |
| 3 | Gen (32)/ Gen (36) /External PWR | Gen (36) | Gen (36) | Gen (32) | — |
| 4 | Gen (32)/ Gen (36) (off) /External PWR | Gen (32) + Gen (36) | Gen (32) + Gen (36) | Gen (32) + Gen (36) | NBPT completed |
| 5 | Gen (32) /External PWR | Gen (32) | Gen (32) | Gen (32) | — |
| 6 | Gen (32) (off) /External PWR | Gen (32) + /External PWR | Gen (32) + /External PWR | Gen (32) + /External PWR | NBPT completed |
| 7 | External PWR | External PWR | External PWR | External PWR | — |

TABLE IIA

Shutdown Sequence
Shutdown sequence — No-break power transfer (NBPT)

| Sequence No. | Power Sources Available | No. 1 270 VDC Bus(58) Powered From | No. 2 270 VDC Bus(60) Powered From | No. 3 270 VDC Bus(56) Powered From | No-Break Power Status |
|---|---|---|---|---|---|
| 1 | Gen (32)/Gen (34) /Gen 2(36) /External PWR | Gen (34) | Gen (36) | Gen (32) | — |
| 2 | Gen (32)/ | Gen (34) + | Gen (34) + | Gen (32) | NBPT |

TABLE IIA-continued

Shutdown Sequence
Shutdown sequence — No-break power transfer (NBPT)

| Sequence No. | Power Sources Available | No. 1 270 VDC Bus(58) Powered From | No. 2 270 VDC Bus(60) Powered From | No. 3 270 VDC Bus(56) Powered From | No-Break Power Status |
|---|---|---|---|---|---|
|  | /Gen (36) (off) /Gen (34) /External PWR | Gen (36) | Gen (36) |  | completed |
| 3 | Gen (32)/ Gen (34) /External PWR | Gen (34) | Gen (34) | Gen (32) | — |
| 4 | Gen (32)/ Gen (34) (off) /External PWR | Gen (32) + Gen (34) | Gen (32) + Gen (34) | Gen (32) + Gen (34) | NBPT completed |
| 5 | Gen (32) /External PWR | Gen (32) | Gen (32) | Gen (32) | — |
| 6 | Gen (32) (off) /External PWR | Gen (32) + /External PWR | Gen (32) + /External PWR | Gen (32) + /External PWR | NBPT completed |
| 7 | External PWR | External PWR | External PWR | External PWR | — |

As previously noted, each of the power system control assemblies 10, 12 and 14 includes two different solid state circuit breakers 22, 22', 22" and 28, 28', 28". The circuit breakers 22, 22' and 22" operate to control the 270 V DC power flow from the generators 32, 34, 36 to the electrical equipment. The circuit breakers 28, 28', 28" operate to control the 28 V DC power flow from DC—DC converters 29, 29' and 29", which serve to convert 270 V DC power to a lower voltage. The lower 28 V DC power stream will serve to operate any on board switches, relays, or other electronic equipment which cannot utilize the primary 270 V DC power produced by the on board generators.

An on board battery 84 is provided in the system 2. The following is an example of no-break power transfer for the secondary (28 VDC) power system from the battery 84 to any of the DC—DC converters 29, 29' and 29". A battery relay 86 is connected to a manually operable cockpit switch 9 via line 7. The battery relay switch 86 includes relay switches 88 and 90. When the switch 9 is closed, the battery relay 86 closes the battery switch 88 allowing the battery 84 to power the microprocessor 26 and the circuit breaker 28 through the battery bus 92. When any one of the generators 32, 34 or 36 are started ant the DC—DC converter 29 is energized, the microprocessor 26 signals the battery relay 86 through line 91 to perform a no-break power transfer momentarily by closing the relay switch 90 before opening the relay switch 88. Once the relay switch 88 is opened the battery is disconnected from the aircraft instruments. The battery 84 then functions only as a backup power source in the event any of the DC—DC converters 29, 29' or 29" should lose generator power. The battery bus 92 is connected to a split bus 96, 98 whose segments are interconnected by contact 100 whenever the DC—DC converter 29 is shut off. The split bus segment 96 is connected to the DC—DC converter 29", split bus segment 98 is connected to the DC—DC converter 29', and the split bus segment 92 is connected to the DC—DC converter 29.

It will be readily appreciated that the uninterrupted power supply system of this invention can be used to supply power to electronic equipment having diverse voltage power requirements. The use of a split bus assembly provides for essentially unlimited system configurations; and results in lower system cost, weight and bulk. Startup of the on board system is made quicker and smoother since electronic equipment first energized by an external power source, such as on board microprocessor-controlled equipment, will not shut down and will not perform restart sequences when the switch is made from external to internally generated power. Similarly, shut down of the on board system is simplified and more secure, since mission or flight data not stored in memory will not be inadvertently lost due to interruptions in power which might otherwise occur during shut down.

Since many changes and variations of the disclosed embodiment of the invention may be made without departing from the inventive concept, it is not intended to limit the invention otherwise that as required by the appended claims.

What is claimed is:

1. A system for supplying uninterrupted electrical power to electronic equipment on an aircraft during changeover from one electrical power source to another electrical power source, said system comprising:

a) a split primary electrical power transfer bus which includes at least first and second serially connectable adjacent segments;

b) a first electrical power source for supplying power to said electronic equipment through said first and second segments of said split bus;

c) a first selectively actuable power source contactor interposed between said first and second segments of said split bus;

d) a second electrical power source for supplying power to said electronic equipment;

e) a second selectively actuable power source contactor interposed between said second electrical power source and said electronic equipment;

f) controller means for controlling the state of said first and second contactors, said controller means being operable to sequentially:

i) close said first contactor so as to enable said first electrical power source to supply electrical power to said electronic equipment on the aircraft;

ii) close said second contactor so as to momentarily enable both of said first and second electrical power sources to concurrently supply electrical power in parallel to said electronic equipment on the aircraft; and iii) open said first contactor so as to disable said first electrical power source from supplying electrical power to said electronic equipment through said split bus while maintaining said second contactor in a closed condition so that said electronic equipment continues to be powered by said second electrical power source.

2. A system for supplying uninterrupted electrical power to electronic equipment on an aircraft during changeover between one electrical power source on board the aircraft and another electrical power source external of the aircraft, said system comprising:

a) an on board electrical power source located on the aircraft;

b) an external electrical power source located externally of the aircraft;

c) a split primary electrical power transfer bus which includes at least first and second serially connectable adjacent bus segments;

d) an external power connector component which can be coupled with said external electrical power source;

e) a first selectively actuable power source contactor interposed between said on board electrical power source and said electronic equipment;

f) a second selectively actuable power source contactor interposed between said first and second segments of said split bus; and g) controller means for controlling the state of said first and second contactors, said controller means being operable during start up of the aircraft to sequentially:

i) close said second contactor so as to enable said external electrical power source to supply electrical power to said electronic equipment on the aircraft through said split bus;

ii) close said first contactor so as to momentarily enable both of said on board and external electrical power sources to concurrently supply electrical power in parallel to said electronic equipment on the aircraft; and iii) open said second contactor so as to disable said external electrical power source from supplying electrical power to said electronic equipment while maintaining said first contactor in a closed condition so that said electronic equipment continues to be powered by said on board electrical power source.

3. The system of claim 2 wherein said controller means is operable during shut down of the aircraft to sequentially:

i) close said first contactor so as to enable said on board electrical power source to supply electrical power to said electronic equipment on the aircraft;

ii) close said second contactor so as to momentarily enable both of said on board and external electrical power sources to concurrently supply electrical power to said electronic equipment on the aircraft; and iii) open said first contactor so as to disable said on board electrical power source from supplying electrical power to said electronic equipment while maintaining said second contactor in a closed condition so that said electronic equipment continues to be powered by said external electrical power source through said split bus.

4. A system for supplying uninterrupted electrical power to electronic equipment on board an aircraft, during changeover from a first on board electrical power source to a second on board electrical power source, said system comprising:

a) a first on board electrical power source located on the aircraft;

b) a second on board electrical power source located on the aircraft;

c) a split primary electrical power transfer bus which includes at least first and second serially connectable adjacent bus segments;

d) a first selectively actuable power source contactor interposed between said first electrical power source and said first segment of said split bus;

e) a second selectively actuable power source contactor interposed between said second electrical power source and said electronic equipment;

g) a selectively actuable split bus segment contactor interposed between said first and second segments of said split bus; and h) controller means for controlling the state of said first and second contactors and said split bus segment contactor, said controller means being operable during operation of the aircraft to:

i) close said first contactor and said split bus contactor so as to enable said first electrical power source to supply electrical power to said electronic equipment on the aircraft through said first and second segments of said split bus;

ii) close said second contactor so as to enable said second electrical power source to supply electrical power in parallel to said electronic equipment concurrently with said first power source; and iii) momentarily after closing said second contactor, open said first contactor and said split bus contactor so as to disable said first electrical power source from supplying electrical power to said electronic equipment while maintaining said second contactor in a closed condition so that said electronic equipment continues to be powered by said second electrical power source.

* * * * *